United States Patent
Ren et al.

(10) Patent No.: US 12,200,834 B2
(45) Date of Patent: Jan. 14, 2025

(54) CIRCUIT UNIT FOR LAMP AND LAMP COMPRISING THE SAME

(71) Applicant: CONSUMER LIGHTING (U.S.), LLC, Norwalk, CT (US)

(72) Inventors: Xiaojun Ren, Shanghai (CN); Kun Xiao, Shanghai (CN); Weihu Chen, Shanghai (CN); Fanbin Wang, Shanghai (CN); Abhinav Bhandari, East Cleveland, OH (US)

(73) Assignee: CONSUMER LIGHTING (U.S.), LLC, Norwalk, CT (US)

( * ) Notice: Subject to any disclaimer, the term of this patent is extended or adjusted under 35 U.S.C. 154(b) by 202 days.

(21) Appl. No.: 17/067,640

(22) Filed: Oct. 9, 2020

(65) Prior Publication Data

US 2021/0153312 A1 May 20, 2021

(30) Foreign Application Priority Data

Nov. 15, 2019 (CN) .......................... 201911122472.3

(51) Int. Cl.
*H05B 45/10* (2020.01)
*H05B 45/37* (2020.01)
*H04R 1/02* (2006.01)

(52) U.S. Cl.
CPC ............. *H05B 45/10* (2020.01); *H05B 45/37* (2020.01); *H04R 1/025* (2013.01)

(58) Field of Classification Search
CPC ........ H05B 45/10; H05B 45/37; H05B 45/31; H04R 1/025; H04R 1/028; H04R 2420/07
See application file for complete search history.

(56) References Cited

U.S. PATENT DOCUMENTS 7,038,399 B2  5/2006  Lys et al.
7,817,016 B2  10/2010  Haase
(Continued)

FOREIGN PATENT DOCUMENTS

CN   201344407 Y   11/2009
CN   202652596 U   1/2013
(Continued)

OTHER PUBLICATIONS

CN107770923A (Year: 2018).*
(Continued)

*Primary Examiner* — Minh D A
(74) *Attorney, Agent, or Firm* — Wood IP LLC; Theodore A. Wood

(57) ABSTRACT

Provided are a circuit unit for a lamp and the lamp including the circuit unit. The circuit unit for the lamp may include: a first power stage receiving a first power signal from an Alternating Current (AC) power supply, performing an Alternating Current—Direct Current (AC-DC) conversion for the first power signal to generate a second power signal and performing a dimming signal conversion for the first power signal to generate a first dimming signal, and a second power stage connected with the first power stage to receive the second power signal output from the first power stage, herein, the second power stage adjusts the second power signal based on at least the first dimming signal, in this way a third power signal is generated, and the second power stage provides a light-emitting unit of the lamp with the third power signal to drive the light-emitting unit.

17 Claims, 4 Drawing Sheets

(56) References Cited

U.S. PATENT DOCUMENTS

| | | | |
|---|---|---|---|
| 10,141,739 B1 * | 11/2018 | Davis | H05B 45/37 |
| 2006/0119176 A1 | 6/2006 | Macaluso et al. | |
| 2010/0280922 A1 | 11/2010 | Giovannotto | |
| 2010/0327763 A1 * | 12/2010 | Yao | H05B 41/2985 |
| | | | 315/250 |
| 2015/0334800 A1 * | 11/2015 | Fawaz | H05B 45/385 |
| | | | 315/294 |
| 2017/0188421 A1 * | 6/2017 | Motomura | H05B 45/37 |
| 2017/0223794 A1 * | 8/2017 | Lewis | H05B 45/10 |
| 2019/0191526 A1 * | 6/2019 | Wang | H01H 37/76 |
| 2019/0320515 A1 * | 10/2019 | Sadwick | H05B 45/00 |

FOREIGN PATENT DOCUMENTS

| | | | |
|---|---|---|---|
| CN | 103108454 A | | 5/2013 |
| CN | 104011458 A | | 8/2014 |
| CN | 203979973 U | | 12/2014 |
| CN | 204153529 U | | 2/2015 |
| CN | 104981078 A | * | 10/2015 |
| CN | 107770923 A | | 3/2018 |
| CN | 108476351 A | | 8/2018 |
| CN | 108605194 A | | 9/2018 |
| CN | 108990223 A | | 12/2018 |
| CN | 109792820 A | | 5/2019 |
| WO | 2016110833 A2 | | 7/2016 |
| WO | 2018058298 A1 | | 4/2018 |

OTHER PUBLICATIONS

CN107770923 (Year: 2018).*
Notice of Issuance for Chinese Application No. 2019111224723 mailed Jul. 17, 2024, 4 pages.

* cited by examiner

CIRCUIT UNIT FOR LAMP AND LAMP COMPRISING THE SAME

CROSS-REFERENCE TO RELATED APPLICATION

This application claims priority to and the benefit of Chinese Patent Application No. 2019111224723, filed on Nov. 15, 2019, the entire contents of which are incorporated herein by reference.

TECHNICAL FIELD

The disclosure refers to the technical field of illumination, and in particular to a circuit unit for a lamp and the lamp including the circuit unit.

BACKGROUND

A lamp is a common illumination tool in daily life and is usually mounted at a location, such as on a ceiling, as to provide illumination lights for an environment. In recent years, during various illumination applications, people expect to adjust luminance of output light of the lamp and usually adjust power provided to the lamp with a dimmer, thereby adjusting the light output of the lamp. For example, a user interface of the dimmer may be mounted on a wall and provided with a switching/adjusting mechanism, such as a knob and a sliding rod so that the lamp may be switched on and off and the light output of the lamp may be adjusted. In addition, the lights may be adjusted with a remote controller, specifically, light brightness of the lamp may be adjusted through Bluetooth, WiFi and other wireless control modules in combination with a drive power source of a Pulse Width Modulation (PWM) control mode. However, this means is usually expensive and unaffordable for a general consumer. In addition, people may not adjust light intensity of the lamp with an existing wall switch or a lamp switch.

Furthermore, as high requirements of the people on comfort of the environment are increased, the lamp having only illumination function is unable to meet people's needs, for example, an integrated acoustic-optical lamp in the market may provide the illumination function and respond to an input of an audio signal to reproduce a sound. An existing integrated lamp may set the lamp and a loudspeaker apparatus in one, so that the lamp may provide the illumination function through a light-emitting unit and provide an electroacoustic transformation function through the loudspeaker apparatus when providing electricity to the light-emitting unit and the loudspeaker apparatus, respectively. However, the existing integrated acoustic-optical lamp may have the following defects: 1, a circuit unit of the existing integrated lamp does not have a function of changing a voltage of a circuit, and accordingly does not have a function of adjusting the light; 2, the circuit unit of the existing integrated lamp may change the voltage in the circuit and output a constant voltage to the loudspeaker apparatus, so as to ensure operating stability of the lamp, and, however, the circuit unit needs to be provided with two circuit paths for the light-emitting unit and the loudspeaker apparatus in parallel, to ensure that the constant voltage is output to the loudspeaker apparatus. In this way, the circuit unit needs to have a big size, thus the manufacturing cost of the circuit unit is increased.

SUMMARY

The disclosure is intended to provide a lamp and a circuit unit thereof, and with the adoption of the lamp and the circuit unit, at least one of the abovementioned defects may be mitigated or eliminated.

An embodiment of the disclosure provides a circuit unit for a lamp, and the circuit unit may include a first power stage and a second power stage. The first power stage receives a first power signal from an Alternating Current (AC) power supply, performs an Alternating Current—Direct Current (AC-DC) conversion on the first power signal to produce a second power signal and performs a dimming signal conversion on the first power signal to produce a first dimming signal. The second power stage is connected with the first power stage to receive the second power signal output from the first power stage, wherein, the second power stage adjusts the second power signal based on at least the first dimming signal, to generate a third power signal, and the second power stage provides a light-emitting unit of the lamp with the third power signal to drive the light-emitting unit.

The AC power supply is a phase cut dimmer providing an AC signal of a non-standard AC voltage, and the first power stage is further configured to maintain the first power signal output by the phase cut dimmer stable.

The first power stage may include: an AC-DC converter connected between the phase cut dimmer and the second power stage and configured to perform the AC-DC conversion on the first power signal, and a phase cut dimmer compatible circuit connected to the phase cut dimmer and configured to ensure the operation of the phase cut dimmer stable to maintain the first power signal output from the phase cut dimmer stable.

The first power stage may include a first dimming signal generating circuit, and the first dimming signal generating circuit receives the first power signal from the AC power supply and performs the dimming signal conversion on the first power signal to generate the first dimming signal.

The second power stage receives the first dimming signal and adjusts the second power signal with the first dimming signal.

The circuit unit may further include at least one second dimming signal generating circuit, the at least one second dimming signal generating circuit receives the first dimming signal from the first dimming signal generating circuit, converts the first dimming signal to at least one second dimming signal and inputs the at least one second dimming signal to the second power stage, and the second power stage adjusts the second power signal with the at least one second dimming signal.

The circuit unit may further include at least one second dimming signal generating circuit, the at least one second dimming signal generating circuit inputs the at least one second dimming signal to the second power stage, and the second power stage adjusts the second power signal with a combined signal obtained through a combination of the at least one second dimming signal and the first dimming signal.

The second power stage receives the at least one second dimming signal from an external apparatus, and the second power stage adjusts the second power signal with the combined signal obtained through the combination of the at least one second dimming signal and the first dimming signal.

The at least one second dimming signal may include two or more second dimming signals, so that the second power stage adjusts the second power signal with a combined signal obtained through a combination of the two or more second dimming signals.

The second power signal output from the first power stage may further be used to drive a loudspeaker apparatus in the lamp to operate.

The loudspeaker apparatus is further configured to produce a third dimming signal, the second power stage receives the third dimming signal from the loudspeaker apparatus and receives the first dimming signal from the first power stage, so that the second power stage may adjust the second power signal with a combined signal obtained through a combination of the first dimming signal and the third dimming signal.

The combination may include a multiplication operation, an addition operation, a subtraction operation or any combination thereof.

The second dimming signal generating circuit may include an acoustic-electro conversion unit, a motion sensor apparatus and an optical sensor apparatus.

The circuit unit may further include a smoothing part, and the smoothing part is connected between the first power stage and the second power stage to make the second power signal smooth.

The embodiment of the disclosure further provides a lamp including the abovementioned circuit unit. In addition, the lamp may further include a loudspeaker apparatus connected to a first power stage and receiving a second power signal from the first power stage to drive the loudspeaker apparatus to operate.

BRIEF DESCRIPTION OF THE DRAWINGS

An illustrative embodiment may take various subassemblies and subassembly distribution forms. The illustrative embodiment is shown in the drawings, and in all the drawings, an identical reference number may indicate a corresponding or similar part in each drawing. The drawing is configured to explain an objective of the embodiment only and should not be interpreted to limit the disclosure. The aspect of novelty of the disclosure would be apparent for those of ordinary skill in the relevant art with the possible description of the drawings below.

DETAILED DESCRIPTION OF THE EMBODIMENTS

Although the disclosure describes an illustrative embodiment in allusion to a specific application, it is to be understood that the disclosure is not limited to this. Those skilled in the art and a person receiving teaching provided by the disclosure may recognize that the scope and the disclosure may have additional applications, modifications and embodiments with a significant effect in other fields.

An exemplary embodiment described in the disclosure provides multiple advantages over a typical lamp. For example, an existing wall switch is allowed to adjust lights of the lamp. As for an integrated acoustic-optical lamp, even when a current and a voltage input to the lamp are adjusted, a constant current may be output to a light-emitting unit and a constant voltage may be output to a loudspeaker apparatus in the integrated acoustic-optical lamp in a simple way, without configuring two circuit paths for the light-emitting unit and the loudspeaker apparatus in parallel.

Figure 1:
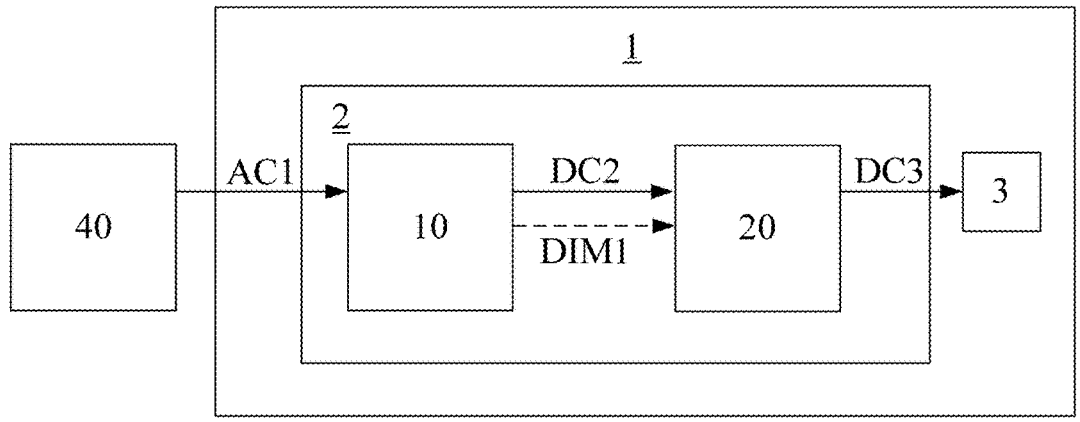
FIG. 1 shows a block diagram of a lamp according to an embodiment of the disclosure.

FIG. 1 shows a lamp 1 according to an embodiment of the disclosure. The lamp 1 may include a circuit unit 2 and a light-emitting unit 3, wherein, the light-emitting unit 3 is electrically connected with the circuit unit 2, and the circuit unit 2 is configured to supply power from an external power supply to the light-emitting unit 3, so that the light-emitting unit 3 provides a using environment of the lamp with illumination lights.

Specifically, as shown in FIG. 1, the circuit unit 2 may include a first power stage 10 and a second power stage 20. The first power stage 10 receives a first power signal AC1 from an Alternating Current (AC) power supply 40, performs an Alternating Current—Direct Current (AC-DC) conversion on the first power signal AC1 to produce a second power signal DC2 and performs a dimming signal conversion on the first power signal AC1 to produce a first dimming signal DIM1. The second power stage 20 is connected with the first power stage 10 to receive the second power signal DC2 output from the first power stage 10, wherein, the second power stage 20 adjusts the level of the second power signal DC2 based on at least the first dimming signal DIM1, to generate a third power signal DC3. The second power stage 20 provides a light-emitting unit 3 with the third power signal DC3 to drive the light-emitting unit 3.

Herein, the first power signal AC1 may be an AC signal provided by the AC power supply 40, the second power signal DC2 and the third power signal DC3 may be DC signals, and the first dimming signal DIM1 may be a square waveform signal or DC signal. The light-emitting unit 3 may include multiple light-emitting diode devices.

The AC power supply 40 may be a phase cut dimmer providing the lamp 1 with the AC signal of a non-standard AC voltage, herein, the phase cut dimmer is connected between a standard power supply (namely, so-called mains supply) providing a standard AC voltage and the lamp 1. Furthermore, the first power stage 10 may maintain the first power signal AC1 output by the phase cut dimmer to be stable, namely, various parameters of the first power signal AC1, such as amplitude and frequency.

In the embodiment, the circuit unit 2 in the lamp produces the dimming signal to adjust brightness of lights output by the light-emitting unit, therefore intensity of the lights output by the lamp may be adjusted by making use of an existing wall switch or a lamp switch with the phase cut dimmer, without additionally replacing the wall switch or using a remote controller. Accordingly, operating complexity may be reduced, and the cost of the lamp may be reduced.

Figure 2:
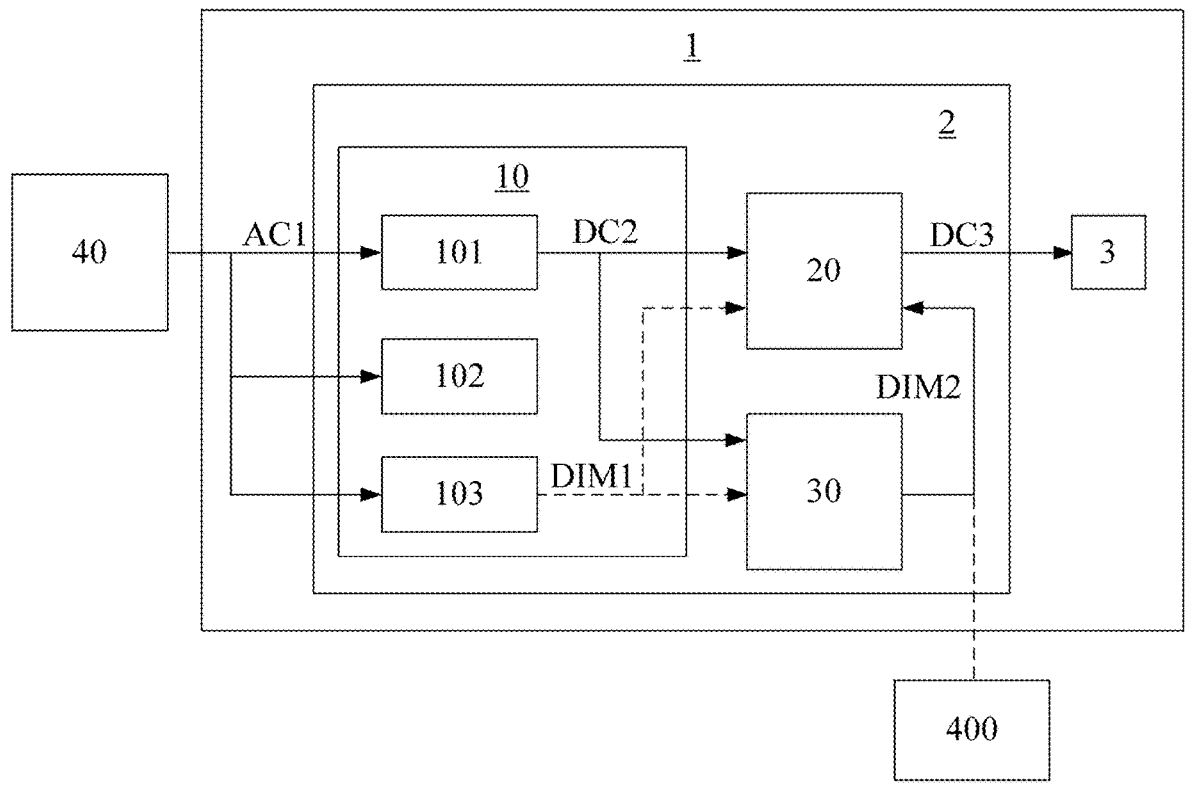
FIG. 2 shows a block diagram of a lamp according to another embodiment of the disclosure.
Figure 6:
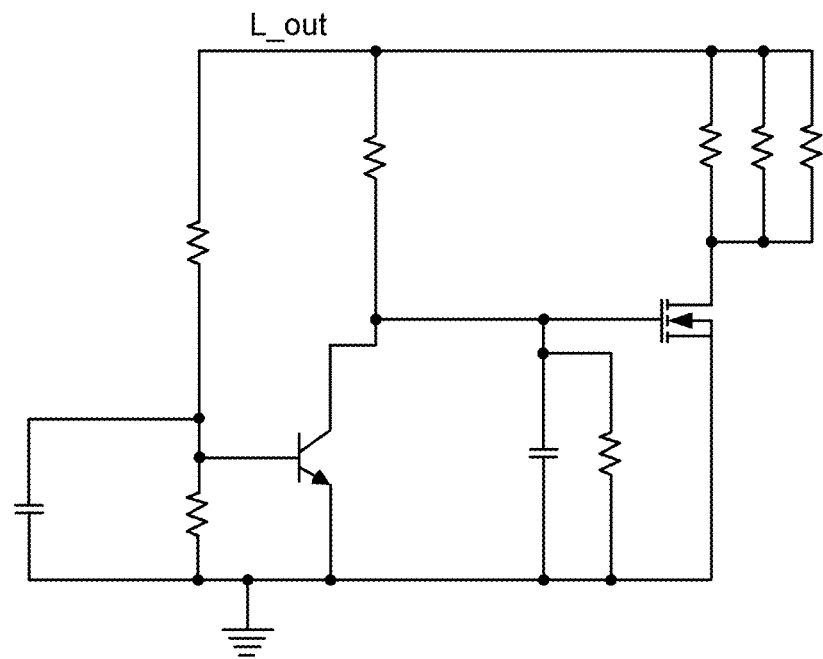
FIG. 6 shows a circuit schematic diagram of a phase cut dimmer compatible circuit of a circuit unit of a lamp according to an embodiment of the disclosure.
Figure 7:
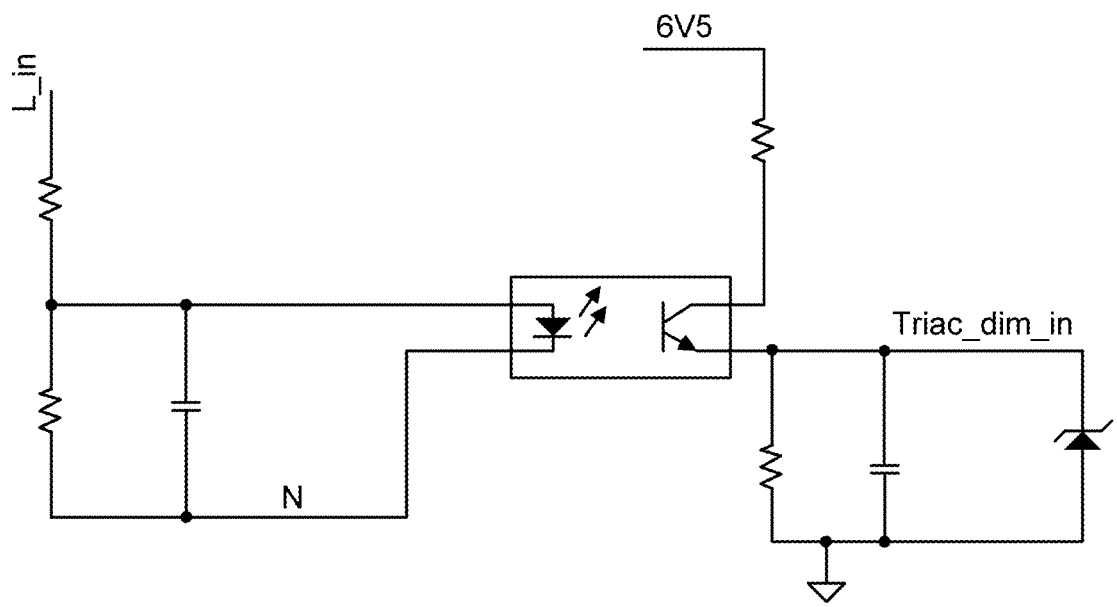
FIG. 7 shows a circuit schematic diagram of a first dimming signal generating circuit of a circuit unit of a lamp according to an embodiment of the disclosure.

Further, as shown in FIG. 2, FIG. 2 shows a lamp 1 according to another embodiment of the disclosure. As shown in FIG. 2, the first power stage 10 may include an Alternating Current—Direct Current (AC-DC) converter 101, a phase cut dimmer compatible circuit 102 and a first dimming signal generating circuit 103. The AC-DC converter 101 is connected between the AC power supply 40 as a phase cut dimmer and the second power stage 20, and is configured to perform an AC-DC conversion on the first power signal AC1 provided from the AC power supply 40 to generate the second power signal DC2 as a DC signal. The phase cut dimmer compatible circuit 102 is connected to the AC power supply 40 as the phase cut dimmer, and is configured to ensure stable operating of the phase cut dimmer to maintain the first power signal AC1 output from the phase cut dimmer to be stable, an example of the phase cut dimmer compatible circuit 102 is shown in FIG. 6. The first dimming signal generating circuit 103 receives the first power signal AC1 from the AC power supply 40 and performs a dimming signal conversion on the first power signal AC1 to generate the first dimming signal DIM1, wherein FIG. 7 shows a circuit schematic diagram of the first dimming signal generating circuit 103.

In particular, the phase cut dimmer compatible circuit 102 enables the circuit unit 1 to be compatible with various types of dimmer in market, thereby avoiding the case that various types of the dimmer having different phase cut angles may cause the circuit unit 1 to unable to drive the light-emitting unit to operate. The first dimming signal generating circuit 103 coverts the phase cut angle of the first power signal AC1 from the AC power supply 40 as the phase cut dimmer into the dimming depth information, for example, the phase cut angle of the first dimming signal DIM1 may be converted into the duty cycle of the square waveform or the amplitude of the DC signal by an analog circuit or a single-chip microcomputer according to particular algorithms such as a multiplication operation, an addition operation, a subtraction operation or any combination thereof.

The first dimming signal DIM1 may be directly input to the second power stage 20 so that the second power stage 20 adjusts the level of the second power signal DC2 with the first dimming signal DIM1, and accordingly the intensity of lights output from the light-emitting unit 3 is adjusted.

Alternatively, the lamp 1 may further include at least one second dimming signal generating circuit 30, the first dimming signal DIM1 may be input to the at least one second dimming signal generating circuit 30 instead of being directly inputted to the second power stage 20, so that the at least one second dimming signal generating circuit 30 generates at least one second dimming signal DIM2 based on the first dimming signal DIM1 and inputs the at least one second dimming signal DIM2 to the second power stage 20, and the second power stage 20 adjusts the second power signal DC2 with the at least one second dimming signal DIM2. Specifically, the second dimming signal generating circuit 30 may generate at least one electric signal based on other conditions, and combines the electric signal with the first dimming signal to generate the at least one second dimming signal DIM2. Other conditions may include a condition of an environment where the lamp is positioned, such as sound intensity, intensity of the light and whether there is a person in the environment. These other conditions may be acquired by an acoustic-electro conversion unit, an presence detector, an optical sensor, a motion sensor and the like, and converted to at least one electric signal, as to combine it with the first dimming signal DIM1 to generate the second dimming signal DIM 2.

In a situation that the at least one second dimming signal DIM2 includes two or more second dimming signals DIM2, the second power stage 20 combines the two or more second dimming signals DIM2 input to the second power stage 20 to generate a combined signal, and the second power signal DC2 is adjusted with the combined signal. The combination may include a multiplication operation, an addition operation, a subtraction operation or any combination thereof on the two or more second dimming signals.

Alternatively, the at least one second dimming signal generating circuit 30 may directly generate at least one second dimming signal DIM2 based on other conditions, and output the at least one second dimming signal DIM2 to the second power stage 20. The second power stage 20 may further receive the first dimming signal DIM1 so that the second power stage 20 adjusts the second power signal DC2 with the combined signal obtained through a combination of the at least one second dimming signal DIM2 and the first dimming signal DIM1.

Alternatively, the second power stage 20 may receive the at least one second dimming signal DIM2 from an external apparatus 400, so that the second power signal DC2 is adjusted with the combined signal obtained through the combination of the at least one second dimming signal DIM2 and the first dimming signal DIM1 received from the first power stage 10.

Herein, the abovementioned combination may include a multiplication operation, an addition operation, a subtraction operation or any combination thereof.

The second dimming signal generating circuit 30 may include the acoustic-electro conversion unit, the motion sensor, the optical sensor, the presence detector and the like, and may be powered by the second power signal DC2 output from the AC-DC converter 101. In addition, the second dimming signal generating circuit 30 may be a remote controller provided outside the lamp.

Figure 3:
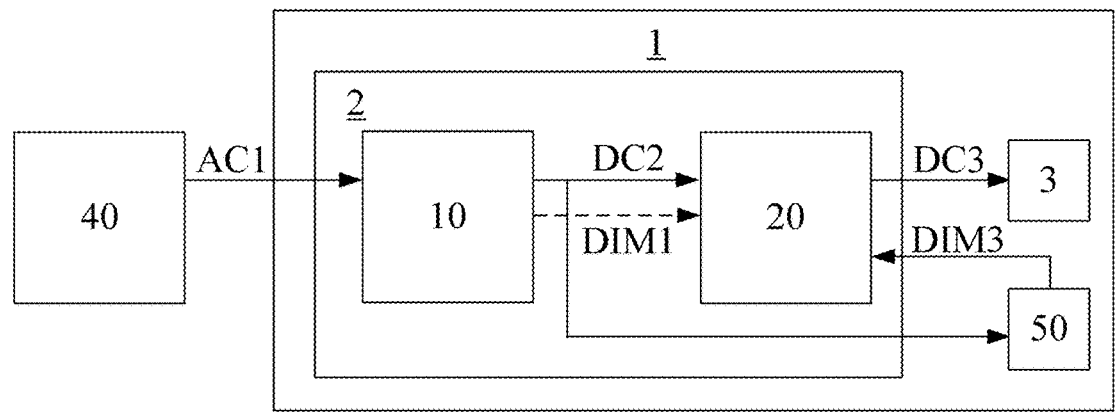
FIG. 3 shows a block diagram of a lamp according to another embodiment of the disclosure.

FIG. 3 shows a block diagram of a lamp according to another embodiment of the disclosure. Compared with the lamp 1 shown in FIG. 1, a difference of the lamp 1 shown in FIG. 3 lies in: an integrated acoustic-optical lamp is taken, namely, the lamp 1 may further include a loudspeaker apparatus 50 connected to the first power stage 10 and receiving the second power signal DC2 from the first power stage 10, and the second power signal DC2 is configured to drive the loudspeaker apparatus 50 to operate. As an example, the loudspeaker apparatus 50 may be a wireless speaker for receiving an audio signal from an external source.

Specifically, the loudspeaker apparatus 50 may generate an acoustical signal based on the received audio signal so that the lamp 1 may emit lights and make a sound.

In the embodiment, because the first power stage 10 provides a dimming signal of adjusting the intensity of lights output by the light-emitting unit 3 and an electric signal of driving the loudspeaker apparatus 50, the voltage output to the loudspeaker apparatus 50 by the first power stage 10 may be ensured to be constant, so that a operating status of the loudspeaker apparatus 50 may not be subjected to any adverse effect. Thus, the loudspeaker apparatus 50 may operate stably and provide good sound quality.

Further, in the embodiment, the loudspeaker apparatus 50 does not need to be otherwise provided with a signal control part, in this way the circuit unit of the lamp may be simplified and minimized and accordingly the manufacturing cost of the circuit unit may be reduced.

Further, the loudspeaker apparatus 50 may further be configured to generate a third dimming signal DIM3 and output the third dimming signal DIM3 to the second power stage 20, so that the second power stage 20 may adjust the second power signal DC2 with a combined signal obtained through a combination of a first dimming signal DIM1 and the third dimming signal DIM3. Specifically, the loudspeaker apparatus 50 may generate the third dimming signal DIM3 based on the intensity of the sound to be output. Of course, as an alternative, the loudspeaker apparatus 50 may also generate the third dimming signal DIM3 based on other conditions as needed.

In addition, although it is not shown, as an example, the first dimming signal DIM1 output from the first power stage 10 may be output to the loudspeaker apparatus 50 instead of output to the second power stage 20, in this way the loudspeaker 50 may generate the third dimming signal DIM3 based on the first dimming signal DIM1 and output the third dimming signal DIM3 to the second power stage 20, and accordingly the second power stage 20 may adjust the second power signal DC2 with the third dimming signal DIM3.

Still further, the second power stage 20 may adjust the second power signal DC2 with a combined signal obtained through a combination of the second dimming signal DIM2 generated by the at least one second dimming signal generating circuit 30 based on the first dimming signal DIM1 and the third dimming signal DIM3 generated by the loudspeaker apparatus 50 based on the first dimming signal DIM1.

Alternatively, the second power stage 20 may adjust the second power signal DC2 with a combined signal obtained through a combination of the first dimming signal DIM1 received from the first power stage 10, the second dimming signal DIM2 generated by the at least one second dimming signal generating circuit 30 and the third dimming signal DIM3 generated by the loudspeaker apparatus 50.

The abovementioned second dimming signal DIM2 and the abovementioned third dimming signal DIM3 are similar to the first dimming signal DIM1, and may be a square waveform signal or a DC signal.

Figure 4:
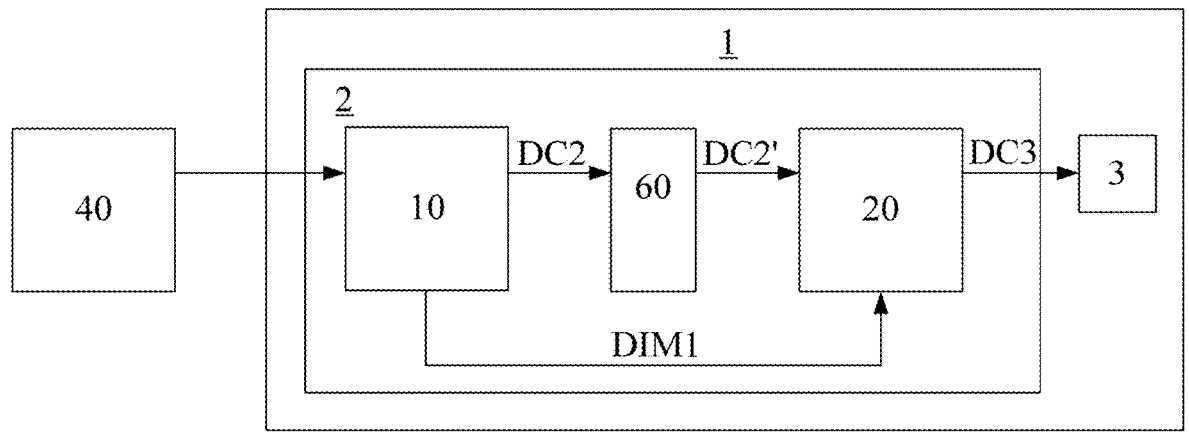
FIG. 4 shows a block diagram of a lamp according to another embodiment of the disclosure.
Figure 5:
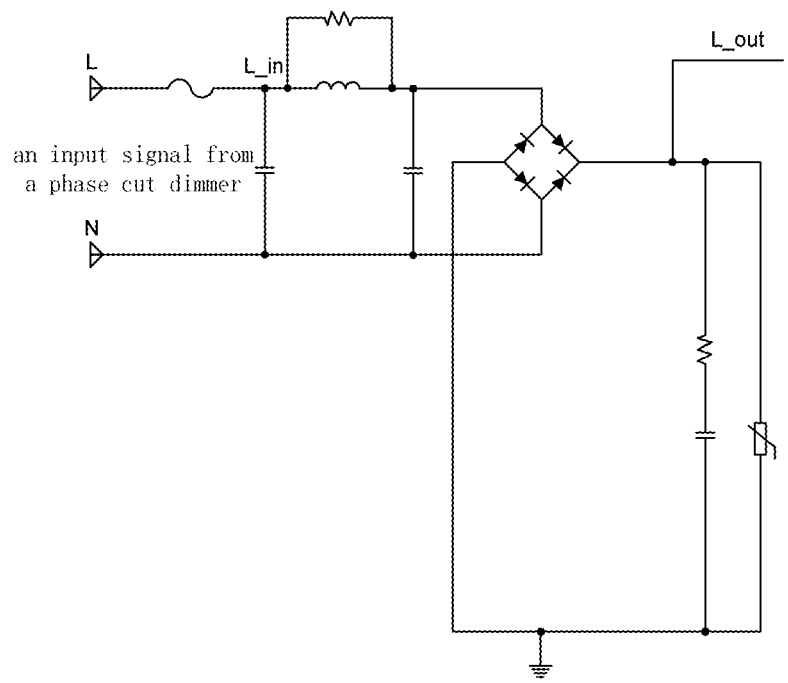
FIG. 5 shows a circuit schematic diagram of a part of a circuit unit of a lamp according to an embodiment of the disclosure, this part is connected between the phase cut dimmer and the first power stage of the circuit unit.

FIG. 4 shows a block diagram of a lamp according to another embodiment of the disclosure. Compared with the lamp 1 shown in FIG. 1, a difference of the lamp 1 shown in FIG. 4 lies in: the lamp 1 further includes a smoothing part 60 connected between the first power stage 10 and the second power stage 20 to receive the second power signal DC2 from the first power stage 10, and remove an AC component in the second power signal DC2, in this way a smooth power signal DC2' is generated. Furthermore, the smoothing part 60 provides the second power stage 20 and the loudspeaker apparatus 50 (if any) with the generated smooth power signal DC2'. Herein, the smoothing part 60 may be a filter, a capacitor and the like.

It is to be noted that the circuit unit of the present disclosure may include a circuit board, herein the first power stage, the second power stage and components included therein may be configured on the circuit board. A type of the circuit board is not limited and may be a Printed Circuit Board (PCB), a Flexible Printed Circuit Board (FCB) and the like. Furthermore, each component may be configured on the circuit board through printing, etching and other methods.

In addition, the second power stage 20 may include a Direct Current—Direct Current (DC-DC) drive. The DC-DC drive receives the second power signal DC2 from the first power stage 10 and output the third power signal DC3 to the light-emitting unit 3. Furthermore, the DC-DC drive may receive one or more of the first dimming signal DIM1, the second dimming signal DIM2 and the third dimming signal DIM3 to adjust the level of the second power signal DC2, in this way the third power signal DC3 is generated.

It is to be understood by those skilled in the art that the above embodiments are examples only, and herein features of the different embodiments may be combined with each other to acquire the embodiments which are readily conceivable according to contents of the disclosure but not pointed out clearly in the drawings.

The abovementioned embodiments are only examples of the embodiments of the disclosure, all components of the abovementioned embodiments may be combined with each other without departing from the scope and spirit of the disclosure, and various changes and modifications of the abovementioned embodiments may be configured. Therefore, it is to be understood that the teaching of the disclosure may be implemented with an embodiment different from those specifically described in the disclosure within the scope of attached claims.

What is claimed is:

1. A circuit unit for a lamp, comprising:
a first power stage configured to receive a first power signal from an Alternating Current (AC) power supply, perform an Alternating Current-Direct Current (AC-DC) conversion on the first power signal to generate a second power signal, and performs a dimming signal conversion on the first power signal from the Alternating Current (AC) power supply to generate a first dimming signal; and
a second power stage configured to be connected with the first power stage to simultaneously receive the second power signal and the first dimming signal both output from the first power stage, wherein, the second power stage adjusts the second power signal based on at least the first dimming signal to generate a third power signal, and the second power stage provides a light-emitting unit of the lamp with the third power signal to drive the light-emitting unit, and
wherein the first power stage being connectable to a loudspeaker apparatus and the second power signal being a constant voltage output from the first power stage is further configured to drive the loudspeaker apparatus in the lamp to operate at a same time and wherein the loudspeaker apparatus is further configured to generate a third dimming signal, the second power stage receives the third dimming signal from the loudspeaker apparatus and receives the first dimming signal from the first power stage, so that the second power stage is able to adjust the second power signal with a combined signal obtained through a combination of the first dimming signal and the third dimming signal;
wherein upon operation, the loudspeaker apparatus is configured to (i) receive an audio signal from an external source and (ii) generate an acoustical signal based on the received audio signal, thereby causing the lamp to make sounds.

2. The circuit unit as claimed in claim 1, wherein the AC power supply is a phase cut dimmer providing an AC signal of a non-standard AC voltage, and the first power stage is further configured to maintain the first power signal output by the phase cut dimmer stable.

3. The circuit unit as claimed in claim 2, wherein the first power stage comprises:
an AC-DC converter connected between the phase cut dimmer and the second power stage and configured to perform the AC-DC conversion on the first power signal; and
a phase cut dimmer compatible circuit connected to the phase cut dimmer and configured to ensure stable operating of the phase cut dimmer to maintain the first power signal output from the phase cut dimmer stable.

4. The circuit unit as claimed in claim 1, wherein the first power stage comprises a first dimming signal generating circuit, and the first dimming signal generating circuit receives the first power signal from the AC power supply and performs the dimming signal conversion on the first power signal to generate the first dimming signal.

5. The circuit unit as claimed in claim 4, wherein the second power stage receives the first dimming signal and adjusts the second power signal with the first dimming signal.

6. The circuit unit as claimed in claim 5, wherein the circuit unit further comprises at least one second dimming signal generating circuit, the at least one second dimming signal generating circuit inputs the at least one second dimming signal to the second power stage, and the second power stage adjusts the second power signal with a combined signal obtained through a combination of the at least one second dimming signal and the first dimming signal.

7. The circuit unit as claimed in claim 6, wherein the combination comprises a multiplication operation, an addition operation, a subtraction operation or any combination thereof.

8. The circuit unit as claimed in claim 6, wherein the second dimming signal generating circuit comprises an acoustic-electro conversion unit, a motion sensor, an optical sensor and a presence detector.

9. The circuit unit as claimed in claim 5, wherein the second power stage receives the at least one second dimming signal from an external apparatus, and the second power stage adjusts the second power signal with the combined signal obtained through the combination of the at least one second dimming signal and the first dimming signal.

10. The circuit unit as claimed in claim 9, wherein the combination comprises a multiplication operation, an addition operation, a subtraction operation or any combination thereof.

11. The circuit unit as claimed in claim 4, wherein the circuit unit further comprises at least one second dimming signal generating circuit configured to receive the first dimming signal from the first dimming signal generating circuit, generate at least one second dimming signal based on the first dimming signal, and input the at least one second dimming signal to the second power stage, and the second power stage adjusts the second power signal with the at least one second dimming signal.

12. The circuit unit as claimed in claim 11, wherein the at least one second dimming signal comprises two or more second dimming signals, and the second power stage adjusts the second power signal with a combined signal obtained through a combination of the two or more second dimming signals.

13. The circuit unit as claimed in claim 12, wherein the combination comprises a multiplication operation, an addition operation, a subtraction operation or any combination thereof.

14. The circuit unit as claimed in claim 11, wherein the second dimming signal generating circuit comprises an acoustic-electro conversion unit, a motion sensor, an optical sensor and a presence detector.

15. The circuit unit as claimed in claim 1, further comprising a smoothing part connected between the first power stage and the second power stage to make the second power signal smooth.

16. A lamp, comprising the circuit unit as claimed in claim 1.

17. The circuit unit as claimed in claim 1, wherein the combination comprises a multiplication operation, an addition operation, a subtraction operation or any combination thereof.

* * * * *